United States Patent Office 3,376,331
Patented Apr. 2, 1968

3,376,331
PREPARATION OF ALUMINUM CYCLO-
PENTADIENYL COMPOUNDS
Wolfram R. Kroll, Linden, N.J., assignor to Esso Research and Engineering Company, a corporation of Delaware
No Drawing. Filed Oct. 30, 1963, Ser. No. 319,985
6 Claims. (Cl. 260—448)

ABSTRACT OF THE DISCLOSURE

Aluminum compounds are directly reacted with cyclopentadiene to form aluminum cyclopentadienyl compounds at temperatures ranging from 120–350° C., the cyclopentadiene being diluted in an inert gas stream.

This invention relates to a novel process for preparing organometallic compounds. More particularly, the invention is concerned with a novel process for preparing organoaluminum compounds.

Aluminum cyclopentadienyl compounds and other related materials are valuable as intermediates for a wide variety of processes in addition to their use as a catalyst component in polymerization reactions such as the polymerization of propylene. For example, the organoaluminum compound can be subjected to growth type reactions to yield a variety of bifunctional compounds. These bifunctional compounds can be converted to alcohols by oxidation, thereby yielding products which are suitable for detergent manufacture. Furthermore, these metalorgano compounds can be converted into polyfunctional olefins which are useful as antiknock compounds in gasoline or as monomers or additives in copolymerization where the double bond can be used to attach dyes to the polymer or to increase the stability of certain elastomers and rubbers. Several methods have been described in the art for the direct interaction of cyclopentadiene with metallic lithium, sodium, potassium, magnesium, calcium, and strontium to produce the metal cyclopentadienyl compound in a room temperature reaction. This procedure, however, is incapable of producing the corresponding aluminum-cyclopentadienyl compounds. As a result, prior art investigators have developed techniques such as the use of Grignard reagents, alkylation of aluminum chlorides with alkali-cyclopentadiene and alkylation of aluminum chlorides with mercury-cyclopentadiene. These known methods are not, at present, of commercial value.

It is an object of this invention to provide a simple and economical method for the direct preparation of cyclopentadienyl aluminum compounds, and related organo-aluminum compounds.

In accordance with the present invention, it has now been discovered that the direct reaction of cyclopentadiene and aluminum compounds may be carried out at higher temperatures under critical and carefully controlled reaction conditions to selectively yield quantitative amounts of dialkyl-cyclopentadienyl-alumium compounds. While it was previously believed that the use of higher temperature in a direct reaction of the type described above would result in rapid dimerization of the cyclopentadiene, it has now been discovered that substantial dimer formation may be avoided if the proper reaction conditions are employed.

The over-all reaction of this invention may be represented by the following equation:

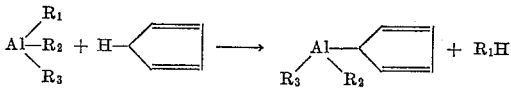

where $R_1$, $R_2$ and $R_3$ are alkyl groups or hydrogen. In addition to the reaction products shown, the reaction mixture may contain byproducts such as bis- and tris-aluminum-cyclopentadienyl, addition products of aluminum alkyls and dicyclopentadiene, derivatives of aluminum cyclopentyl and dicyclopentyl and alkyl aluminum hydrides. This invention contemplates the use of aluminum trialkyls, aluminum dialkylhydrides and aluminum alkyldihydrides wherein the total number of carbon atoms in the starting organoaluminum reactant ranges from $C_1$ to $C_{50}$, preferably $C_2$ to $C_{50}$. The choice of aluminum alkyl reactant is not critical since it is well known that some thermal displacement occurs at higher temperature thereby establishing an equilibrium between the trialkyl and dialkylhydride. It is preferred, however, that the length of any single alkyl chain be $C_{12}$ or lower since, as can be seen from the above equation, hydrocarbons of corresponding length will be produced as byproducts in the reaction and higher molecular weight compounds will be more difficult to separate from the desired reaction product due to similarities in the boiling points of the reaction products. The aluminum alkyl reactant may be fed to the reaction vessel alone or dissolved in an inert solvent. Suitable solvents include $C_8$ to $C_{16}$ hydrocarbons, for example nonane, decane, dodecane, and xylene.

While the reaction has been described with respect to cyclopentadiene, several similar hydrocarbons may be employed as alternate starting materials. In general, the hydrocarbon reactants employable in this process are those compounds which possess acidic hydrogen connected to a carbon atom. Particularly, preferred are hydrocarbons in which the hydrogen substituent is activated by one or more double bonds or by an aromatic system. Typical examples of hydrocarbon starting materials in addition to cyclopentadiene which meet these requirements are indene and fluorene.

It is a critical feature of this invention that the hydrocarbon reactant, e.g. cyclopentadiene, be fed to the reaction vessel in the gaseous phase. Such a procedure is essential to avoid substantial dimer formation since operation in the vapor phase tends to dilute the concentration of the cyclopentadiene and therefore minimize the potential for forming the dimers of this compound. In a preferred embodiment the cyclopentadiene or other hydrocarbon reactant is further diluted by mixture with an inert gas. The inert gas should comprise 80% to 99% by volume of the incoming hydrocarbon feed and preferably 85% to 95%. Typical inert gases which may be employed in the process of this invention are nitrogen, methane, argon and helium. In a less preferred embodiment, hydrogen may be used as the diluent gas in the reaction. Although the use of hydrogen invites the possibility of some saturation of the hydrocarbon feed, this drawback is offset by the stabilizing effect of hydrogen on the organoaluminum hydrides, especially at higher temperatures.

The temperature of reaction is another critical feature of the novel process of this invention. The utilization of temperatures below 120° C. will not produce the dialkyl-cyclopentadienyl-aluminum compounds which are the desired products of this invention. A preferred operating range is, therefore, 120° to 350° C., preferably 150° to 250° C. The reaction pressure is not a critical feature of this invention and the reaction is capable of being carried out at both atmospheric and superatmospheric conditions. Since the use of higher pressures is not desirable from an economic standpoint, pressures in the range of 0 to 150 p.s.i.g. are preferred in this reaction.

The residence time of the reactants in the reactor is also a critical feature of this invention since it is essential that the contact time be sufficient to produce quantitative yields of the dialkyl-aluminum cyclopentadienyl compounds without prolonging the exposure of the reactants to by-product formation. In general, the time of the reaction will vary inversely with the temperature employed. Thus when the reaction is carried out at temperatures below 200° C. the reaction time may vary from several minutes to several hours. Preferred operating conditions are in the range of ½ to 2 hours. At temperatures above 250° C. the reaction time is highly critical since decomposition of the reactants and products may occur. Suitable reaction times for the higher temperature range are 0.01 to 10 seconds and preferably 0.1 to 1 second.

In a preferred method of carrying out the above-described reaction a countercurrent flow system is employed wherein liquid organoaluminum reactant is fed to the top of a reaction vessel and is countercurrently contacted at the proper temperature and pressure conditions and for the proper residence time with the upwardly flowing hydrocarbon reactant, for example, cyclopentadiene. A mixture of liquid products, including the desired aluminum-cyclopentadienyl compound is recovered from the bottom of the reactor. Separation techniques, such as distillation or sublimation are employed to recover the final product. It is a surprising feature of this invention that the desired compounds crystallize when subjected to vacuum distillation and may therefore be easily separated from the distillate by decantation.

The invention will be further illustrated by reference to the following examples.

Example 1

To a solution of .8 mole of diisobutylaluminum hydride in 40 ml. heptane were added 1.2 moles of freshly distilled cyclopentadiene. Samples taken at intervals were analyzed by infrared (IR) and did not indicate any reaction after one hour at room temperature. The mixture was warmed up to 60° C. and a gradual decrease in diisobutylaluminum hydride was observed by IR. The reaction was stopped when the hydride had practically disappeared. All volatile hydrocarbons were distilled off in vacuo. The aluminum-organic residue was hydrolyzed and analyzed. Analysis of the residue by gas chromatography indicated over 95 wt. percent dihydro-dicyclopentadiene.

The above experiments indicate that low temperature reaction fails to produce the desired dialkyl-aluminum-cyclopentadienyl compound.

Example 2

.18 mole of triethylaluminum were added to .6 mole of freshly distilled cyclopentadiene at 0° C. and warmed up stepwise to 60° C. No gas evolution was observed which would indicate formation of dialkyl-aluminum-cyclopentadienyl compounds under elimination of ethane. Thus, this experiment also shows that low temperature reaction fails to produce the desired reaction product.

Example 3

.39 mole of triisobutylaluminum was charged into a fritted reaction vessel which was maintained at 170° C. A stream of gaseous cyclopentadiene diluted with 95 vol. percent nitrogen was passed through the frit at a pressure of 5 p.s.i.g. and a flow rate of 5 liters/minute. The dilute cyclopentadiene was preheated before entering the frit. The outgoing gas was passed through several traps in order to remove entrained liquid and finally to condense gaseous reaction products. The reaction was run for one hour. The viscous product from the reactor was filtered and volatile components were removed by distillation in vacuo at .001 mm. and 120° bath temperature. The distillates separated into a solid bottom phase and an upper liquid phase. Analysis of the upper layer by NMR indicated a 1:1 mixture of adduct of triisobutylaluminum and diisobutyl-aluminum-cyclopentadienyl. The solid bottom layer was found to be diisobutyl-aluminum-cyclopentadienyl. Identification of the product was completed by preparing a sample of diisobutyl-aluminum-cyclopentadienyl by halogen interchange from sodium-cyclopentadienyl and diisobutyl-aluminum-monochloride. The IR and NMR spectrum of both compounds were identical. The melting point was found to be 40–41° C., the boiling point was 26° C. at .04 mm. and 50° bath temperature.

Quantitative analysis of the reaction product indicated a 56% conversion of the triisobutyl-aluminum with a 40% selectivity toward aluminum-cyclopentadienyl compounds.

The experiment shows that the direct metalation of cyclopentadiene can be carried out utilizing the reaction conditions of this invention.

Example 4

45.5 g. of diisobutylaluminum hydride were reacted with cyclopentadiene in a manner similar to that described in Example 3. The cyclopentadiene was diluted with nitrogen and the gaseous mixture was passed through the reactor at a rate of 20–30 liters/hr. The reaction temperature was maintained at 150° C. Decomposition of the hydride was indicated by the presence of a gray precipitate. After several hours of reaction, a viscous liquid product was filtered out and degassed in vacuo. A sample of the liquid product was hydrolyzed and subject to analysis by gas chromatography and mass spectrometry. The results indicated a 60% conversion of diisobutylaluminum hydride with a 20% selectivity towards the formation of diisobutyl-aluminum cyclopentadienyl.

Having thus described the general nature and specific embodiments of the invention, the true scope will now be pointed out by the appended claims.

What is claimed is:

1. A process for preparing an aluminum cyclopentadienyl compound which comprises reacting an organoaluminum compound containing 1 to 50 carbon atoms and selected from the group consisting of aluminum trialkyl, aluminum dialkylhydride and aluminum alkyldihydride with a dilute gaseous cyclopentadiene stream at a temperature in the range of 150° to 250° C. for a time sufficient to obtain a reaction product containing said aluminum cyclopentadienyl compound and recovering said aluminum cyclopentadienyl compound.

2. The process of claim 1 wherein said gaseous cyclopentadiene stream is diluted with nitrogen.

3. The process of claim 1 wherein each of the alkyl groups of said aluminum trialkyl, said aluminum dialkylhydride and said aluminum alkyldihydride contains one to 12 carbon atoms.

4. A process for preparing an aluminum cyclopentadienyl compound which comprises reacting triethylaluminum with cyclopentadiene, said cyclopentadiene being diluted with 80 to 99 vol. percent of nitrogen, at a temperature 150° to 250° C. for a time sufficient to recover a reaction product containing diethylaluminum-cyclopentadienyl.

5. A process for preparing an aluminum cyclopentadienyl compound which comprises reacting triisobutyl-aluminum with cyclopentadiene, said cyclopentadiene being diluted with 80 to 99 vol. percent nitrogen, at a temperature of 150° to 250° C. for a time sufficient to obtain a reaction product containing said diisobutylaluminum-cyclopentadienyl.

6. The process of claim 5 wherein said reaction product is subjected to vacuum distillation and said diisobutyl-aluminum cyclopentadienyl is recovered as the solid phase of the distillate.

References Cited

UNITED STATES PATENTS

| | | | |
|---|---|---|---|
| 3,136,667 | 6/1964 | D'Alelio | 260—448 X |
| 3,149,136 | 9/1964 | Bruce | 260—448 |
| 3,153,661 | 10/1964 | D'Alelio | 260—448 |

TOBIAS E. LEVOW, *Primary Examiner.*

H. M. S. SNEED, *Assistant Examiner.*